(12) United States Patent
Scruggs et al.

(10) Patent No.: US 6,533,302 B2
(45) Date of Patent: Mar. 18, 2003

(54) STEP BAR CRADLE AND TRIM CHANNEL

(75) Inventors: Mark Patrick Scruggs, Walled Lake, MI (US); Neal S. Weipert, Redford, MI (US)

(73) Assignee: Draw-Tite, Inc., Canton, MI (US)

( * ) Notice: Subject to any disclaimer, the term of this patent is extended or adjusted under 35 U.S.C. 154(b) by 0 days.

(21) Appl. No.: 09/931,446

(22) Filed: Aug. 16, 2001

(65) Prior Publication Data

US 2003/0034626 A1 Feb. 20, 2003

(51) Int. Cl.⁷ .................................................. B60R 3/00
(52) U.S. Cl. ........................ 280/163; 280/165; 280/169; 248/200; 248/201
(58) Field of Search ................................ 280/163, 169, 280/165, 166; D12/203; 112/203; 248/200, 201

(56) References Cited

U.S. PATENT DOCUMENTS

| | | | | |
|---|---|---|---|---|
| 4,451,063 A | * | 5/1984 | Snyder | 280/163 |
| 4,456,275 A | * | 6/1984 | Snyder et al. | 280/163 |
| 4,557,494 A | * | 12/1985 | Elwell | 362/495 |
| 5,286,049 A | * | 2/1994 | Khan | 280/163 |
| 5,511,750 A | * | 4/1996 | Evenson | 248/200 |
| 5,769,439 A | * | 6/1998 | Thompson | 280/163 |
| 5,823,553 A | * | 10/1998 | Thompson | 280/164.1 |

* cited by examiner

*Primary Examiner*—Brian L. Johnson
*Assistant Examiner*—Brian L. Swenson

(57) ABSTRACT

A step bar cradle and trim channel member. The member includes a curved main body portion connected to a cradle attachment portion. The two portions are attached by a hinge mechanism, such as a living hinge, in order to allow the member to be used in a wide range of mounting systems. The member is positioned between the step bar member and mounting bracket and used to help stabilize the step bar member and also cover the mounting bracket.

5 Claims, 3 Drawing Sheets

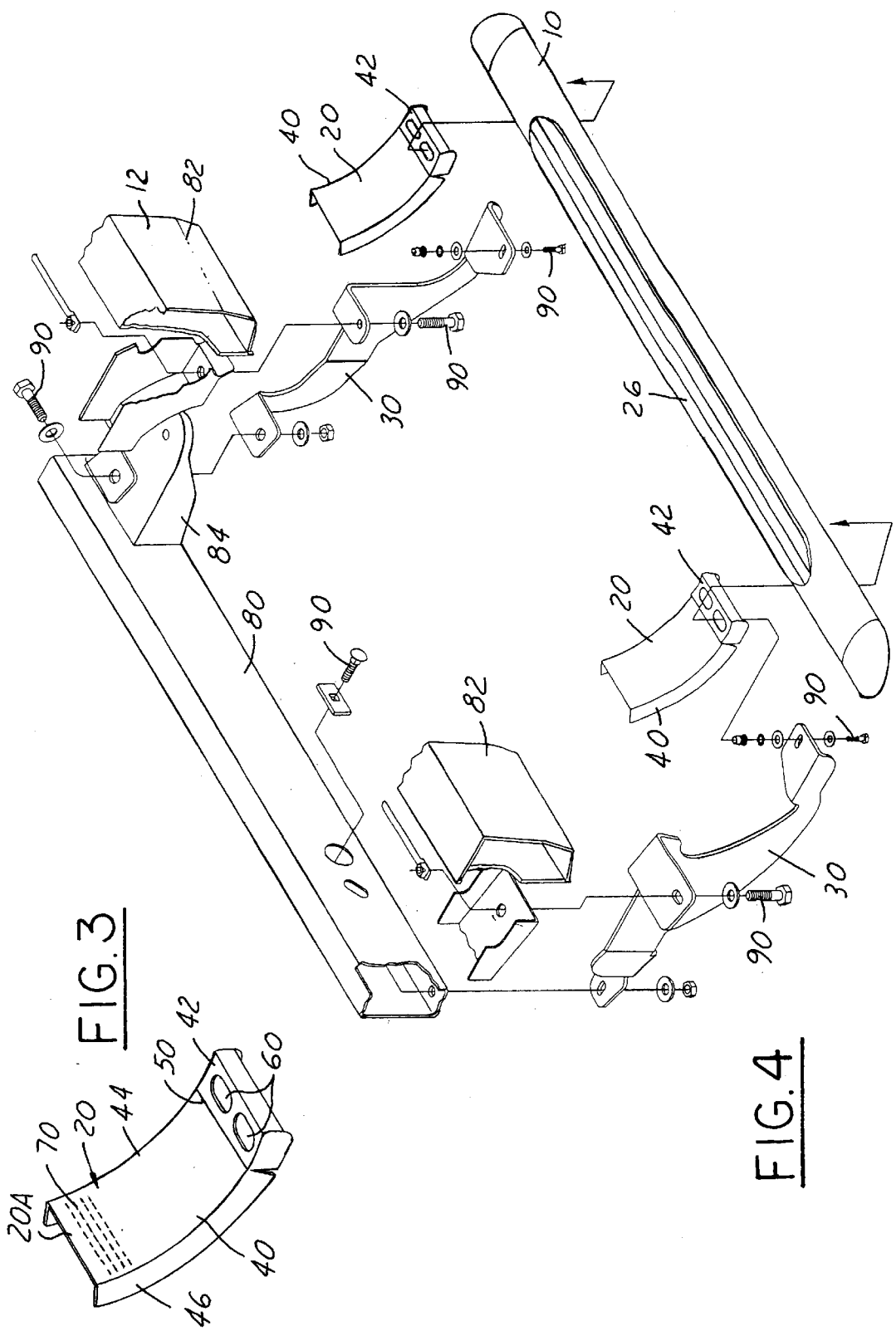

STEP BAR CRADLE AND TRIM CHANNEL

TECHNICAL FIELD

The present invention relates to step bars for vehicles, and more particularly to a step bar cradle and trim channel used to hold step bars in place.

BACKGROUND OF THE INVENTION

Running boards are a popular accessory item for many vehicles, particularly pickup trucks and sport utility vehicles (SUVs). Running boards are also commonly called "step bars." The running boards or step bars provide a pleasing appearance to the vehicle, protect the sides and rocker panels of the vehicle from rocks and gravel thrown from the tires, and provide a convenient stepping stool for occupants to enter and exit from the vehicle.

There is a wide variety of makes and styles of vehicles, as well as a wide variety of styles and types of running boards. Typically, each vehicle, or model of a vehicle, has a particular size and shape of running board that can be used for the vehicle, as well as particular mounting brackets that are necessary for mounting the running board/step bar to the vehicle.

Step bars known today are often difficult to anchor to the mounting brackets and prevent all pivoting and undesired movement. Also, the mounting brackets frequently are unattractive and often trim members are utilized in order to hide them or make them more aesthetically pleasing.

SUMMARY OF THE INVENTION

It is, therefore, a general object of the present invention to provide an improved mounting system for running boards or step bars. It is another object of the present invention to provide a step bar cradle which helps prevent unwanted movement or pivoting of the step bar. It is a further object of the present invention to provide a trim member which can be used to cover unsightly step bar mounting brackets. It is a still additional object of the present invention to provide a step bar cradle and trim channel which will accommodate a wide range of different step bar mounting bracket systems.

These and other objects of the present invention are met by the present invention. The inventive step bar cradle and trim channel includes a generally U-shaped member having a curved main body member and attached mounting portion. The main body member and mounting portion are connected together by a hinge mechanism, such as a living hinge. Large openings in the attachment portion allows use of the invention for mounting a wide range of step bars to a wide variety of mounting brackets.

Preferably, the step bar cradle and trim channel is made from a plastic material, such as a homopolymer polypropylene. The mounting portion also has a curved surface which acts as a cradle for the step bar member.

These and other features and advantages of the present invention will become apparent from the following description of the invention, when viewed in accordance with the accompanying drawings and appended claims.

BRIEF DESCRIPTION OF THE DRAWINGS

FIG. 3 is a perspective view of a step bar cradle and trim channel member in accordance with a preferred embodiment of the present invention;

FIG. 4 is an exploded view illustrating the use of the present invention relative to mounting a step bar member to a vehicle.

DESCRIPTION OF THE PREFERRED EMBODIMENT(S)

The present invention can be used for mounting a wide variety of step bar members with a wide variety of mounting brackets to a wide variety of vehicles. Accordingly, the particular step bar, mounting brackets, and other structural features discussed below are to be taken as only representative or exemplary of the use and features of the present invention.

In particular, the present invention provides a member which assists in stabilizing a step bar member to a vehicle in order to prevent it from moving or pivoting. The present invention also is adapted to be used on a wide variety of mounting brackets and mounting systems for step bar members. The present invention also acts as a trim member which hides the mounting brackets and makes the system more pleasing to the vehicle owner and occupants.

Figure 1:
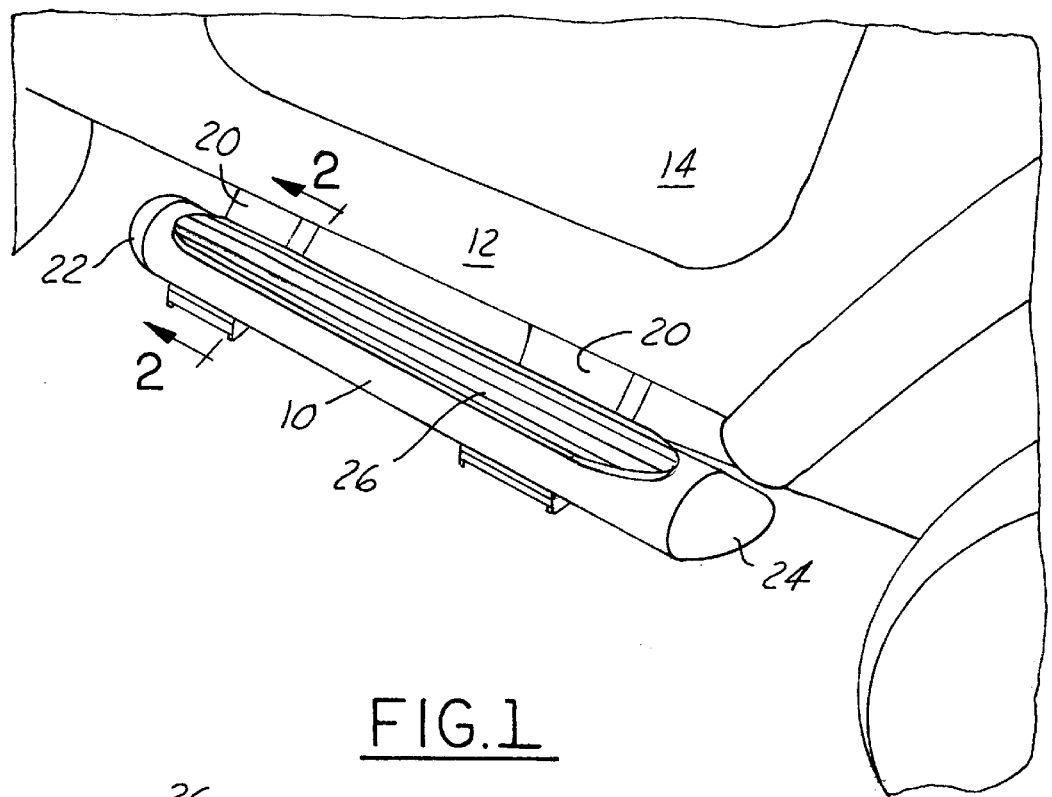
FIG. 1 is a perspective view of a step bar member attached to a vehicle.
Figure 2:
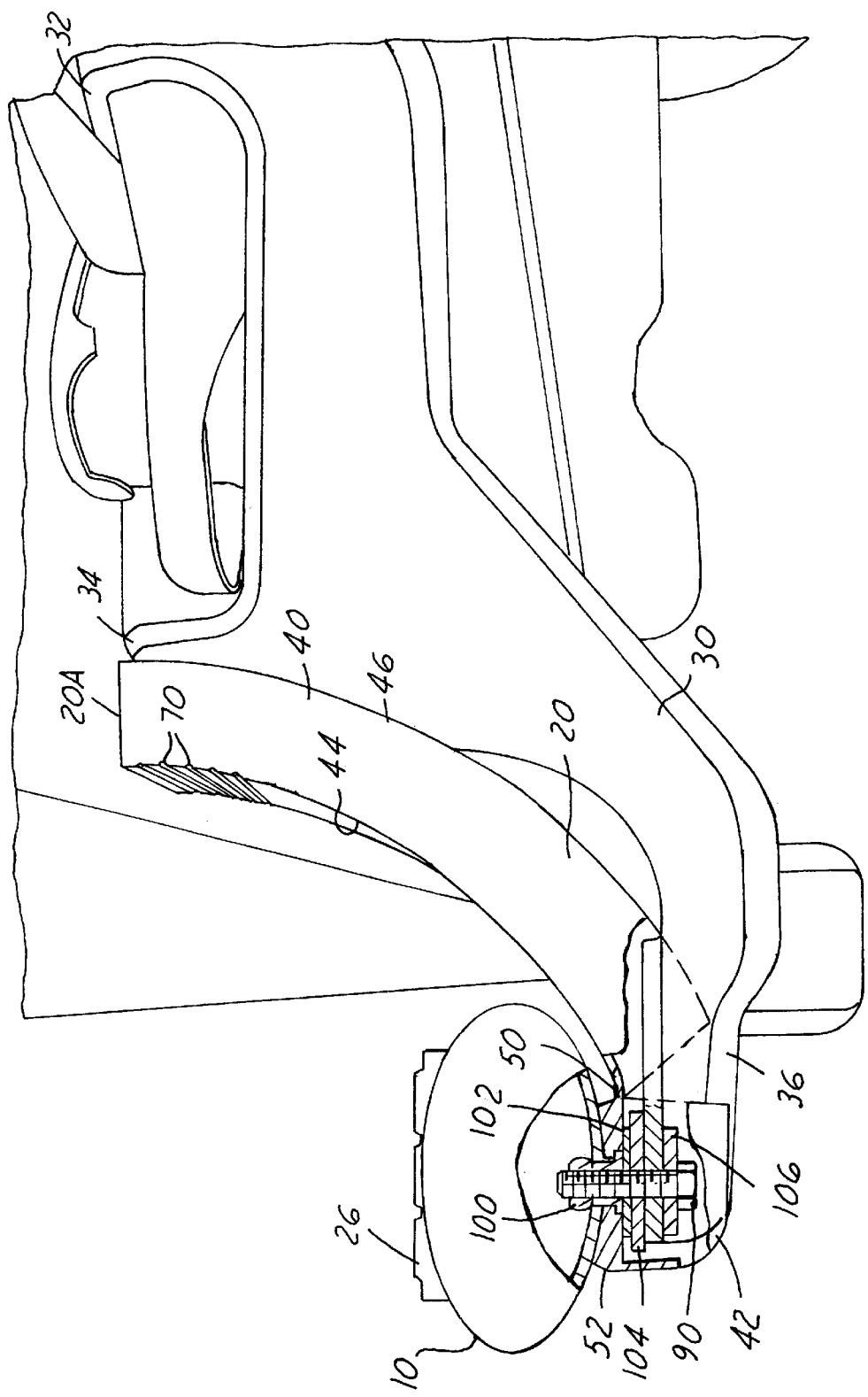
FIG. 2 is a cross-section of the step bar system shown in FIG. 1, the cross-section being taken along lines 2—2 and in the direction of the arrows.

The use of the present invention relative to a step bar member and vehicle is shown in FIG. 1. As shown, step bar member 10 is attached to a vehicle 12 immediately below a door 14 of the vehicle. A pair of step bar cradle and trim channel members 20 are shown positioned between the step bar member 10 and the vehicle 12. The step bar member is typically an elongated member made from a metal material such as aluminum, steel or stainless steel and has attached end members 22 and 24, as well as a non-slip step member 26 on the upper surface. A pair of mounting brackets 30 are positioned beneath the step bar cradle and trim channel 20 and are used to hold the step bar member 10 to the vehicle. This is better shown in FIG. 2, which is a cross-section through the completed assembly shown in FIG. 1. As shown in FIG. 2, the mounting bracket 30 is attached to the vehicle at two positions 32 and 34 and has a cantilevered arm member 36 which extends outwardly from the vehicle and is used to attach the step bar member 10 to the vehicle.

As shown in FIG. 2, and in combination with FIG. 3, the step bar cradle and trim member 20 includes a curved main body portion 40 and an attachment portion 42. The main body member 40 has a generally U-shaped cross-section having a flat upper surface 44 and a pair of side members 46.

Preferably, the member 20 is made from a plastic material, such as a homopolymer polypropylene so that it can be used with a wide variety of vehicles and will continue to provide a pleasing appearance for a long time. Of course, it is understood that the member 20 can be made of any comparable material, such as a metal material.

For use with various vehicles, the member 20 can have the one end 20A trimmed as necessary in order to fit tightly against the vehicle 12. For this purpose, a plurality of uniformly spaced grooves 70 are provided adjacent the upper end 20A. The grooves are preferably 0.010 inch radius of grooves or channels positioned approximately at one-half inch increments from the end. This allows ease of modifying the length of the trim channel member 20 in order to fit various vehicles and hide the mounting brackets 30 from view.

The connecting portion 42 is attached to the main body portion 40 by a hinge mechanism 50, such as a living hinge.

The hinge mechanism 50 allows the step bar cradle and trim channel member 20 to be more versatile for accomplishing its intended purpose.

As better shown in FIG. 2, the upper surface 52 of the attachment portion 42 of the step bar cradle and trim channel member 20 has a curved configuration. The curved surface 52 forms a cradle on which the step bar member 10 is positioned when it is attached to the vehicle. The curved cradle surface is adapted to fit smoothly along the surface of the step bar member and prevent it from pivoting or moving when the mounting brackets are secured to the step bar member.

A pair of enlarged openings 60 are provided in the attachment portion 42 in order for the invention to accommodate a wide variety of mounting brackets and mounting systems.

A representative system showing how the present invention can be used relative to mounting a step bar member to a vehicle is shown in FIG. 4. FIG. 4 is an exploded view of the mounting system used for mounting a step bar member 10 to a vehicle 12, or to at least the frame of the vehicle 12, with a pair of mounting brackets 30. As shown, the step bar cradle and trim channel members 20 are positioned between the mounting brackets 30 and the step bar member 10.

The mounting brackets 30 are secured to a frame member 80 of the vehicle. The vehicle 12 includes a rocker panel 82 and one or more body mount members 84 attached to the frame member. A plurality of conventional nut and bolt type fasteners 90 are used to connect the mounting brackets 30 to the frame of the vehicle as well as to the step bar member 10.

Figure 4A:
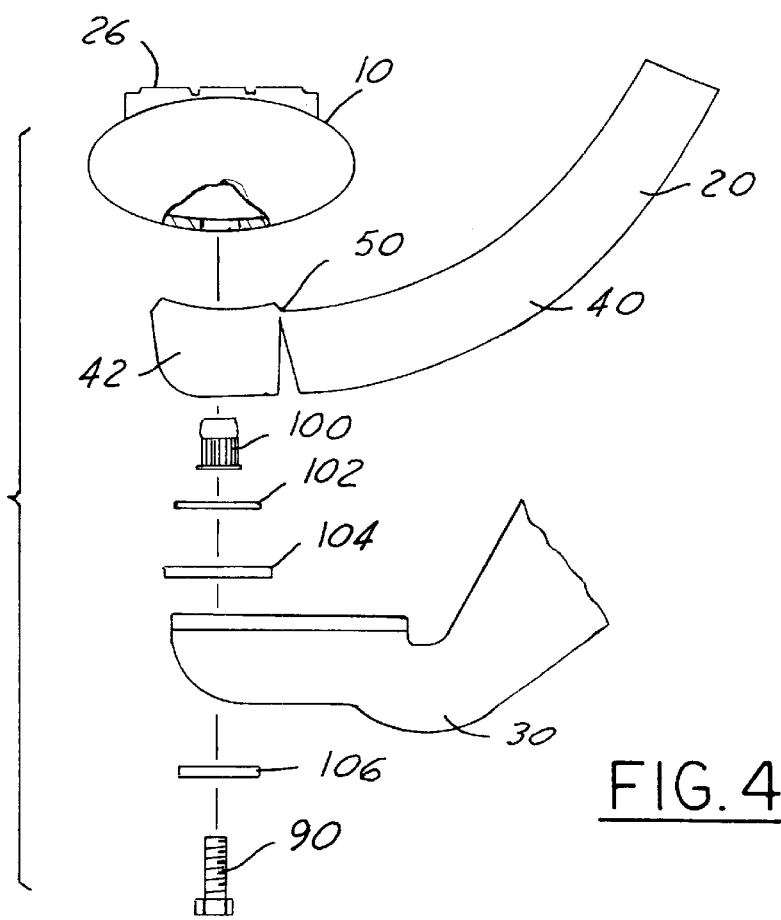
FIG. 4A is an exploded view depicting the mounting of a step bar member to a mounting bracket.

A preferred system for securing the mounting bracket 30 to the step bar member 10 is shown in FIG. 4A. The mounting mechanism includes a rivet nut 100, a lock washer 102, a flat washer 104, a conical toothed washer 106 and a hex bolt 90. When the bolt washers and nuts are assembled together, the trim bar member 10 and step bar cradle and trim channel member 20 are connected to the mounting bracket 30, as particularly shown in FIG. 2.

While particular embodiments of the invention have been shown and described, numerous variations and alternative embodiments will occur to those skilled in the art. Accordingly, it is intended that the invention be limited only in terms of the appended claims.

What is claimed is:

1. A cradle and trim member for mounting a step bar member to a vehicle, said cradle and trim member comprising a body portion and a cradle portion, said cradle portion hingedly attached to said body portion and having a cradle member for holding the step bar member and preventing pivoting thereof.

2. The cradle and trim member as set forth in claim 1 wherein said cradle and trim member is made from a plastic material and said cradle portion is attached to the said body portion by a living hinge.

3. The cradle and trim member as set forth in claim 1 wherein said cradle portion further comprise at least one opening for attachment of the step bar member to a mounting bracket on the vehicle.

4. The cradle and trim member as set forth in claim 1 wherein said body portion is a curved member and further comprises at least one groove for possible use in shortening the length of the body portion.

5. A system for mounting a step bar to a vehicle comprising;

an elongated step bar member;

at least a pair of mounting brackets; and a trim channel member positioned between said step bar member and each of said mounting brackets;

said trim channel member having a body portion and a cradle portion hingedly attached together;

said cradle portion having a cradle member thereon for supporting said step bar member.

* * * * *